(12) United States Patent
Lizárraga Senar

(10) Patent No.: US 12,480,560 B2
(45) Date of Patent: Nov. 25, 2025

(54) SHOCK ABSORBER WITH MULTIPLE DAMPING LAWS

(71) Applicant: Kyb Europe GmbH, Sucursal En Navarra, Ororbia (ES)

(72) Inventor: Javier Lizárraga Senar, Ororbia (ES)

(73) Assignee: Kyb Europe GmbH, Sucursal En Navarra, Ororbia (ES)

( * ) Notice: Subject to any disclaimer, the term of this patent is extended or adjusted under 35 U.S.C. 154(b) by 418 days.

(21) Appl. No.: 18/099,467

(22) Filed: Jan. 20, 2023

(65) Prior Publication Data

US 2023/0235809 A1  Jul. 27, 2023

(30) Foreign Application Priority Data

Jan. 21, 2022 (ES) ................. ES202230048

(51) Int. Cl.
*F16F 9/46* (2006.01)
*F16F 9/342* (2006.01)
*F16F 9/516* (2006.01)
*F16F 9/18* (2006.01)

(52) U.S. Cl.
CPC .............. *F16F 9/464* (2013.01); *F16F 9/342* (2013.01); *F16F 9/516* (2013.01); *F16F 9/182* (2013.01)

(58) Field of Classification Search
CPC ......... F16F 9/46–469; F16F 9/34–3488; F16F 9/512–5165; F16F 9/18–20
See application file for complete search history.

(56) References Cited

U.S. PATENT DOCUMENTS

| | | | |
|---|---|---|---|
| 4,632,228 A * | 12/1986 | Oster ...................... | A47C 3/30 |
| | | | 188/300 |
| 4,653,617 A | 3/1987 | Casimir et al. | |
| 4,953,671 A | 9/1990 | Imaizumi | |
| 5,018,608 A | 5/1991 | Imaizumi | |
| 11,511,585 B2 | 11/2022 | Lizarraga Senar | |

FOREIGN PATENT DOCUMENTS

| JP | S5877943 A | 5/1983 |
|---|---|---|
| WO | 2020141238 A1 | 7/2020 |

* cited by examiner

*Primary Examiner* — David R Morris
(74) *Attorney, Agent, or Firm* — The Webb Law Firm

(57) ABSTRACT

A shock absorber with multiple damping laws comprises a regulating body (12) with a primary valve (14) and a secondary valve (15), and an activating shaft (21) with a plurality of channels (16, 17), the activating shaft (21) being housed in an axial orifice (36) of a piston pin (30) that incorporates a plurality of orifices (31, 32, 33) intended to align by rotation of the activating shaft (21) with the channels (16, 17) to determine a damping law and, with the second orifice (32) in direct communication with the regulating body (12), wherein the regulating body (12) comprises a floating piston (13) that has a toroidal configuration and is made of an elastic material, so that it gradually transfers a force to the primary valve (14) depending on the pressure to which it is subjected.

15 Claims, 17 Drawing Sheets

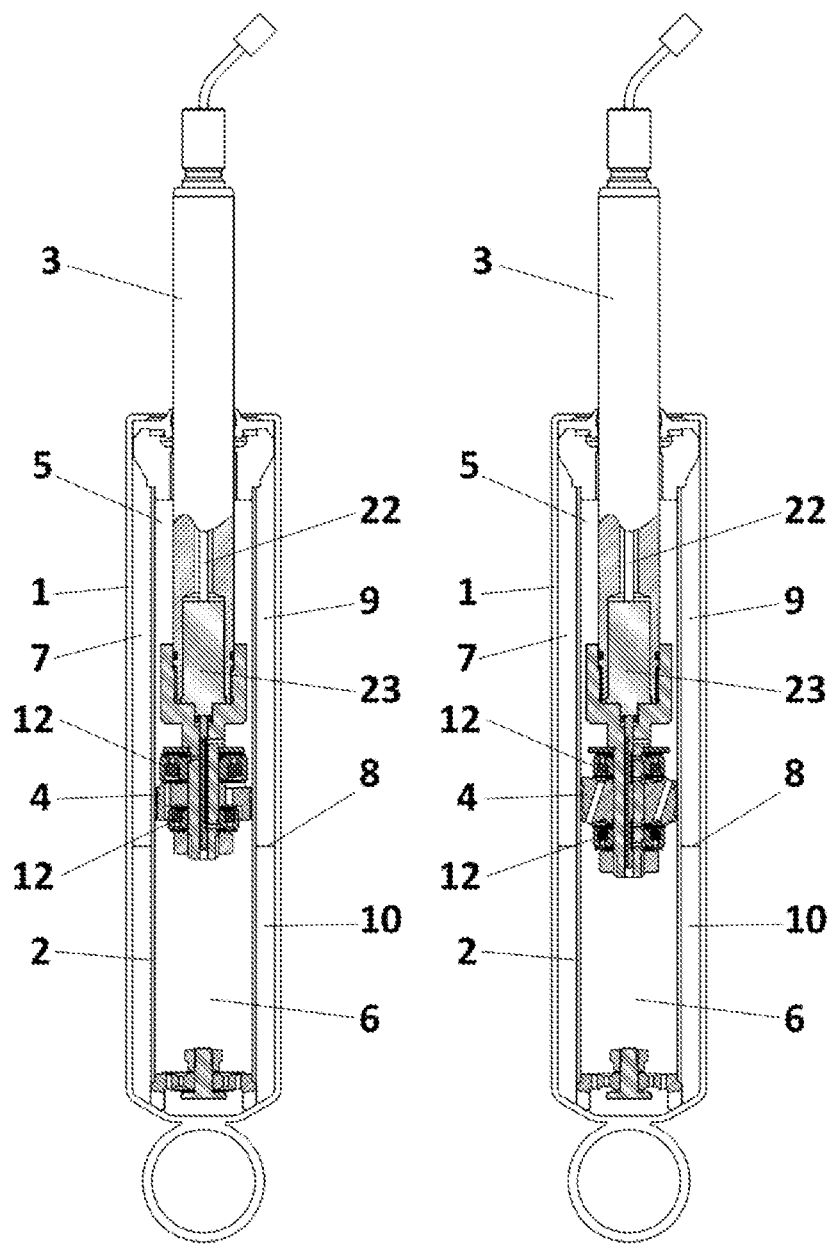

SHOCK ABSORBER WITH MULTIPLE DAMPING LAWS

CROSS-REFERENCE TO RELATED APPLICATION

This application claims priority to Spanish Patent Application No. P202230048 filed Jan. 21, 2022, the disclosure of which is hereby incorporated by reference in its entirety.

BACKGROUND OF THE INVENTION

Field of the Invention

The present invention relates to a shock absorber capable of generating multiple damping laws in order to thus adapt the damping of a device, which can be any type of mechanism, though it is normally a vehicle, to the requirements of its operating regimen. The shock absorber can be modified manually, by the driver or operator himself/herself, or automatically, by means of a calculator, so that the most appropriate damping law is selected for each instant and thus the shock absorber is adapted to the requirements of the operating regimen of the device.

It is particularly applicable in the field of hydraulic devices and, in particular, in the field of shock absorbers for vehicles.

Description of Related Art

A shock absorber is a device intended for attenuating the oscillations of the suspension by means of dissipating kinetic energy until said suspension recovers the equilibrium position thereof. A very common case of development focuses on the application on vehicles.

Focusing on the automotive sector, the shock absorber has a decisive impact on both stability and comfort. In fact, the adjustment of the hydraulic load that it generates represents a compromise between both factors:

- in terms of stability, dynamic control of the vehicle is performed at low extension and compression speeds of the suspension and low oscillation frequencies, corresponding to the natural frequency of the sprung mass (cabin), which is typically in the range of 1-2 Hz for passenger cars. In this operating regimen, a high level of damping, i.e., high hydraulic loads, is required;
- in terms of comfort, control is mainly related to medium and high extension and compression speeds of the suspension which occur at medium or high oscillation frequencies. The reference frequency is the natural frequency of the unsprung mass (wheel/suspension), which is typically in the range of 8-15 Hz for passenger cars. A higher degree of comfort is subject to a reduced level of damping, which allows uncoupling the movement of the wheels from the oscillations of the chassis.

Therefore, it is desirable for the shock absorber to be able to adjust the load level thereof to the characteristics of the oscillations it must attenuate.

Conventional shock absorbers offer a variable damping characteristic based on speed, but it is predetermined and not adaptable by the user or a computer. This is the underlying reason for the trade-off between comfort and stability that must be addressed when adjusting the desired damping law for the suspension of a specific vehicle. It is an optimization exercise which seeks the best trade-off for the character that is to be given to the vehicle.

On the one hand, if the vehicle is geared towards comfort, a low level of damping in the suspension is chosen, so that the movement of the wheel is as uncoupled as possible from the bodywork. In this way, the transfer of road irregularities to the passenger compartment is minimized.

On the other hand, in case the vehicle is geared towards stability, a high level of damping is configured in the suspensions to minimize the movement of the bodywork.

An improvement on the conventional shock absorber would consist of being able to accommodate its load level depending on the desired objective for each moment, being able to select a variety of possibilities of damping laws depending on whether it is desired to vary between greater stability or greater comfort.

In the current state of the art there are different systems capable of generating multiple damping laws with a single shock absorber. These systems are usually based on solenoid valves that can be controlled by linear actuators (solenoids) or rotary actuators (motors).

A technical solution that is commonly found in the state of the art, especially in low-cost systems, consists of incorporating a second piston that regulates the passage of oil through a channel that connects the two chambers delimited by the primary piston, generating two damping laws, one hard and one soft.

In the hard law, the oil passage through the channel is closed, while in the soft law, the oil passage through the channel is open, being regulated by the configuration of the secondary piston. With this operating principle, three or four damping laws can be generated, simply by graduating the passage section that the solenoid valve leaves open.

However, introducing a secondary piston is associated with a series of drawbacks.

On the one hand, it is necessary to incorporate in the secondary piston a series of passive elements that allow the passage of the fluid to be regulated/modified, which implies an increase in the number of elements and that translates into a higher cost and need for axial space.

On the other hand, the channel, which is built as an orifice in the pin of the rod, must have a considerable passage section to allow a low damping law. This requires an increase in the diameter of the pin of the rod which, in turn, increases the radial dimension of the system, making it more difficult to implant. In addition, the larger diameter of the pin requires the use of specific larger pistons, valves, washers and nuts which, once again, make the product more expensive.

Document U.S. Pat. No. 4,953,671A represents a shock absorber capable of operating under different laws by activating a control pin 31 attached to a shaft 30 rotatably inserted inside the rod 7 of the piston 5. The shaft 30 incorporates three longitudinal grooves 33, 34, 35 on the periphery which, depending on the position of the shaft 30, carry out different communications between the upper chamber 3, the lower chamber 4 and pressure chambers 15, 16, which leads to the shock absorber behaving according to a soft damping law, if the communication between the lower chamber 4 and upper chamber 3 is direct or hard, if the communication is through the pressure chambers 15, 16.

The first groove 33 is of such a length that, at one end, it communicates with the upper chamber 3 through a first orifice 36 in the rod 7 of the piston 5 and, at the other end, with a second orifice 37, also in the rod 7 of the piston 5, which communicates with a pressure chamber 16 separated from the lower chamber 4 through a valve 12 that incorporates an orifice 14.

The second groove 34 is located diametrically opposite the first groove 33 and is of such a length that, at one end, it communicates with a third orifice 39 in the rod 7 of the piston 5 which communicates with a pressure chamber 15 separated from the upper chamber 3 through a valve 13 and, at the other end, communicates directly with the lower chamber 4.

The third groove 35 directly communicates the upper chamber 3, by means of an orifice 41 in the rod 7 of the piston 5, with the lower chamber 4.

In said invention, the hard law is obtained by transferring pressure from the upper chamber 3 to chamber 16 to increase damping in extension movements, and from the lower chamber 4 to chamber 15 for compression movements. The shaft 30 is in charge of enabling said transfers in hard law and disabling them in soft law, by means of its rotation in the orifice of the rod 7. However, said rotation requires a clearance with the orifice of the rod 7 which, in the absence of an additional sealing system, allows a certain transfer of pressure, also in the soft law. Since the pressure transferred to chambers 15 and 16 is applied directly to valves 12 and 13, there will be a certain increase in force, also in the soft law.

Another limitation of this invention is that it is only capable of generating two damping laws, one soft and one hard. In addition, as explained in the previous paragraph, the difference in force between the two may not be very high, and may also present a strong variability depending on the clearance between the shaft 30 and the orifice of the rod 7.

Likewise, the direct application of the pressure transferred from chambers 3 and 4 to valves 12 and 13 in the hard law provides an almost instantaneous increase in damping force. This direct response lacks progressiveness in the administration of force, resulting in a greater presence of acceleration peaks in the chassis and an increase in noise. Both effects limit the ability to maintain an adequate comfort level with the hard law.

SUMMARY OF THE INVENTION

As indicated, the present invention relates to a shock absorber capable of generating multiple damping laws in order to thus adapt the damping of a device to the requirements of its operating regimen.

In this way, the present invention describes a shock absorber with multiple damping laws comprising a regulating body with a primary valve and a secondary valve. The shock absorber also comprises an activating shaft, housed in a piston pin and activated manually or automatically. The function of the activating shaft is to select, depending on the position in which it is located by means of rotation, automatically through an actuator or manually through a rod, a damping law determined as described in this specification.

In the case of automatic activation, the actuator incorporates a body, housed in the rod, to which there is attached the activating shaft, which protrudes from the rod to be housed in an axial orifice incorporated in the piston pin, fixed to the rod as an extension and passing through the piston in an axial orifice incorporated therein.

It should be noted that, although it is common for the rod of a shock absorber to be understood as incorporating the body of the rod itself and the piston pin, in this case the two components have been considered independently, separating the rod and piston pin, which is attached to the former in order to house the body of the actuator.

The activating shaft incorporates a plurality of channels, while the piston pin incorporates a plurality of inlet and outlet orifices to connect the two chambers of the shock absorber. These orifices will be for fluid inlet or outlet regardless of whether the shock absorber is making an extension or compression movement, when changing the direction of fluid flow. The alignment of the orifices with the channels will allow the circulation of the shock absorber fluid which will determine the damping law that the shock absorber follows at that moment.

Among the orifices in the piston pin, there are:
a first orifice, which communicates the traction chamber with the axial orifice of the piston pin,
a second orifice, which communicates the axial orifice of the piston pin with the compression chamber through the regulating body, and
a leakage orifice, which communicates the traction chamber with the axial orifice of the piston pin, located in the piston pin and rotated with respect to the first orifice.

On the other hand, among the channels of the activating shaft, there are:
a first channel, with a length such that it communicates the first orifice with the second orifice,
a second channel, with a length such that it communicates the first orifice with an opening at the end of the axial orifice of the piston pin.

The regulating body configures a cavity in which it incorporates a floating piston that has a toroidal configuration and is made of an elastic material, in such a way that it achieves a gradual movement of the primary valve depending on the pressure to which it is subjected, causing with said movement a gradual blocking of the piston conduit.

In this first embodiment, where the shock absorber incorporates a single regulating body, the piston pin can incorporate a second leakage orifice, located as an extension of the leakage orifice, although with a larger passage section.

In a second embodiment, the shock absorber can also comprise an additional regulating body located in concatenation with the regulating body, the regulating body being connected to the second orifice and the additional regulating body being connected to an additional second orifice, located below the second orifice, which also communicates the axial orifice of the piston pin with the compression chamber. In this case, the activating shaft also incorporates a third channel, with a length such that the first orifice communicates with the additional second orifice, and the piston pin incorporates a third leakage orifice, located as an extension of the first orifice and with a passage section that is preferably significantly smaller intended for achieving a harder damping law.

The fact that the additional regulating body is located in concatenation with the regulating body, that is, one after the other, means that the primary valve of the additional regulating body is the secondary valve of the regulating body, so that the effect of the additional floating piston of the additional regulating body reinforces the effect of the floating piston of the regulating body.

The shock absorber can also comprise two regulating bodies, although located one on each side of the piston. In this way, the shock absorber can work according to different damping laws for both compression and extension.

The relationship between the passage sections of the orifices of the piston pin is preferably such that the passage section of the second leakage orifice is greater than that of the first orifice, which in turn is greater than that of the transverse orifice, which in turn is greater than that of the third leakage orifice. In any case, despite being an advantageous configuration, other relationships are possible and functional, providing different damping laws.

The shock absorber can also incorporate a slide, located between the flexible floating piston and the primary valve and capable of sliding along the piston pin, with the function of transmitting the force received from the floating piston to the primary valve in a configurable diameter and also to protect the floating piston. The main purpose of introducing the slide as an intermediate element is to allow the floating piston to work with higher pressures as it is more protected.

On the other hand, the free end of the activating shaft can have a longitudinal extension with a semicircular cross-section, while the axial orifice can incorporate an end orifice with an oblong section offset with respect to the activating shaft. In this way, the movement of the activating shaft is limited to a quarter of a turn, as the walls of the end orifice act as a mechanical stop with the extension of the activating shaft, preventing it from continuing to rotate.

In this situation, one step further implies that the extension is a modified extension with a quarter-circle cross-section and, in addition, the shock absorber comprises a disc fixed to the end of the piston pin with an orifice in the form of a semicircle through which the modified extension passes, so that the free movement of the activating shaft is limited to a quarter of a turn and can rotate an additional quarter of a turn by dragging the disc.

In these cases, the described blocking system can have other configurations in terms of the geometry of the section of the shaft and of the orifice in order to exercise an equivalent limitation with respect to the movement.

As a summary, it can be considered that the main advantages provided by this solution are the following:

- Simplicity: secondary piston is not required. A new design of the piston valves is provided so that they can be regulated directly under a load. This design is compatible with standard valve components.
- Cost: there is a significant savings in components, eliminating the secondary piston.
- Consumption: a rotary actuator (motor) consumes less energy than a linear actuator (solenoid), since it only consumes during the change from one position to another, and not to maintain the position.
- Compactness: the activating shaft is directly connected to the motor or actuator, which can be installed inside the rod and have very small dimensions, like the activating shaft, minimizing the load in its rotation. In the state of the art, the activating shaft is connected to an actuator through a control pin, with the shaft being of a larger diameter and the friction of the shaft in the orifice of the piston pin also being greater, so the opposition torque due to friction of the shaft in the orifice of the piston pin is also greater. This greater opposition requires a more powerful and larger actuator, which cannot be housed inside the rod.
- Standardization: the flow volume of the fluid to be exchanged between the two chambers delimited by the piston is small, since it is only used to modify the permanent leakage (low speed) and to feed the regulating body (hard law). This allows it to be used with a standard small diameter piston pin, which further involves using the standard piston and valves as well, so it is not necessary to oversize the elements. Conversely, in double piston systems, most of the flow volume moved by the piston in its movement must pass through the orifice of the piston pin, making it necessary to increase its diameter.

Additionally, as an alternative to using a rotary motor as an actuator, the activating shaft can also be manually actuated through a rod that is attached to the shaft and extends to the outside of the rod of the shock absorber.

BRIEF DESCRIPTION OF THE DRAWINGS

To complete the description of the invention, and for the purpose of helping to make the features thereof more readily understandable, according to a preferred exemplary embodiment thereof, a set of drawings is included wherein, by way of illustration and not limitation, the following figures have been represented:

FIG. 2A depicts a longitudinal section view of the shock absorber with an actuator for compression and extension movements in a first embodiment.

FIG. 2B depicts a longitudinal section view of the shock absorber with an actuator for compression and extension movements in a second embodiment.

Figure 1A:
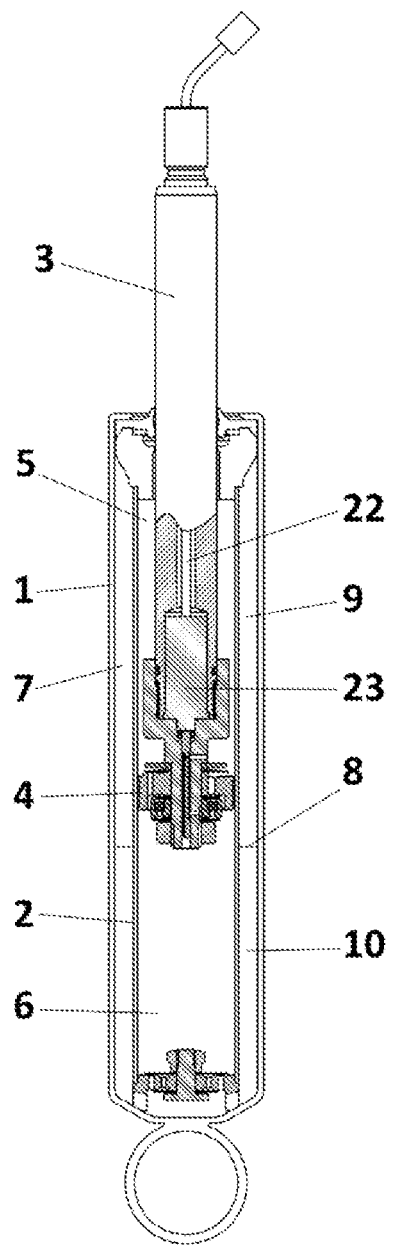
FIG. 1A depicts a longitudinal section view of the shock absorber of the invention activated automatically for extension movements.

A list of the references used in the figures is provided below:
1. Outer casing.
2. Inner tube.
3. Rod.
4. Piston.
5. Traction chamber.

6. Compression chamber.
7. Compensation chamber.
8. Oil level.
9. Gas.
10. Oil.
11. Compression valve.
12. Regulating body.
12'. Additional regulating body.
13. Floating piston.
13'. Additional floating piston.
14. Primary valve.
15. Secondary valve.
15'. Additional secondary valve.
16. First channel.
17. Second channel.
18. Third channel.
20. Actuator.
21. Activating shaft.
22. Actuator cable.
23. Actuator body.
24. Extension for two positions.
25. Extension for three positions.
26. First seal.
27. Second seal.
28. Conduit.
30. Piston pin.
31. First orifice.
32. Second orifice.
32'. Additional second orifice.
33. Leakage orifice.
34. Second leakage orifice.
35. Third leakage orifice.
36. Axial orifice.
37. End orifice.
38. Spring.
39. Disc.
40. Access channel.
41. Regulating body chamber.
42. Primary permanent passage.
43. Secondary permanent passage.
44. Regulating body casing.
45. Rotation limiting plate.
46. Separation bushing.
47. Slide.
48. Flat face of the piston pin.

DESCRIPTION OF THE INVENTION

The present invention discloses a shock absorber capable of selecting up to four different damping laws. It can be activated automatically or by manual means from the outside. To do this, it incorporates an activating shaft (21) attached to an actuator (20) that is connected by a cable (22) to a connector, in the case of automatic selection, or attached directly to a mechanism, not depicted in the figures, in the case of manual selection. The damping law is selected simply by rotating the activating shaft (21) to the appropriate position as will be described below, to hydraulically connect the appropriate orifices (31, 32, 32', 33, 34, 35, 36) with the appropriate channels (16, 17, 18).

Both the connector and the mechanism are known in the state of the art and are attached to the corresponding devices so that the selection of the appropriate damping law can be carried out.

On the other hand, a twin-tube shock absorber, with an outer casing (1) and an inner tube (2) inside which the piston (4) is located, has been considered, although it could be extended to other types of shock absorber such as a monotube or a triple tube shock absorber.

Figure 1B:
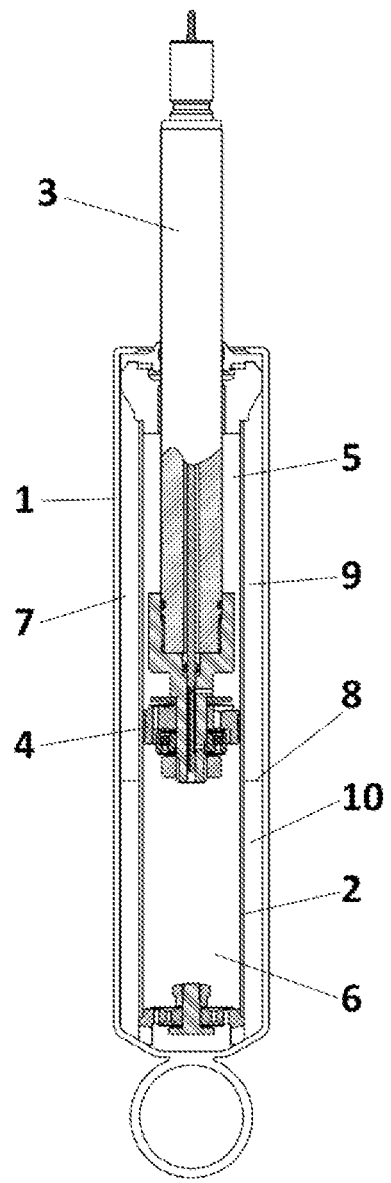
FIG. 1B depicts a longitudinal section view of the shock absorber of the invention activated manually from the outside for extension movements.

FIGS. 1A and 1B depict longitudinal section views of the shock absorber of the invention for automatic and manual selection of the damping law respectively for extension movements, by incorporating a regulating body (12) in the compression chamber (6) of the shock absorber.

In turn, FIG. 2A depicts the shock absorber of FIG. 1A conditioned to provide multiple damping laws for both extension and compression movements, by incorporating a second regulating body (12), located in the traction chamber (5).

FIG. 2B depicts a second embodiment of the shock absorber of FIG. 2A, where the communication of the regulating bodies (12) with the traction chamber (5) and compression chamber (6) has been modified.

There are no functional differences between these two embodiments. The embodiment of FIG. 2A is adapted to standard double-acting (DA) pistons, and that of FIG. 2B to double-acting pistons with cross bores (DAC). The difference between the two embodiments lies in the radial orifices in the piston pin (30). In the second embodiment, more bores are required than in the first embodiment, since the orifice for the intake of oil towards the regulator body in the compression phase takes the oil from "below" the corresponding primary valve (14), and not directly from the traction chamber (5) or compression chamber (6).

Figure 3A:
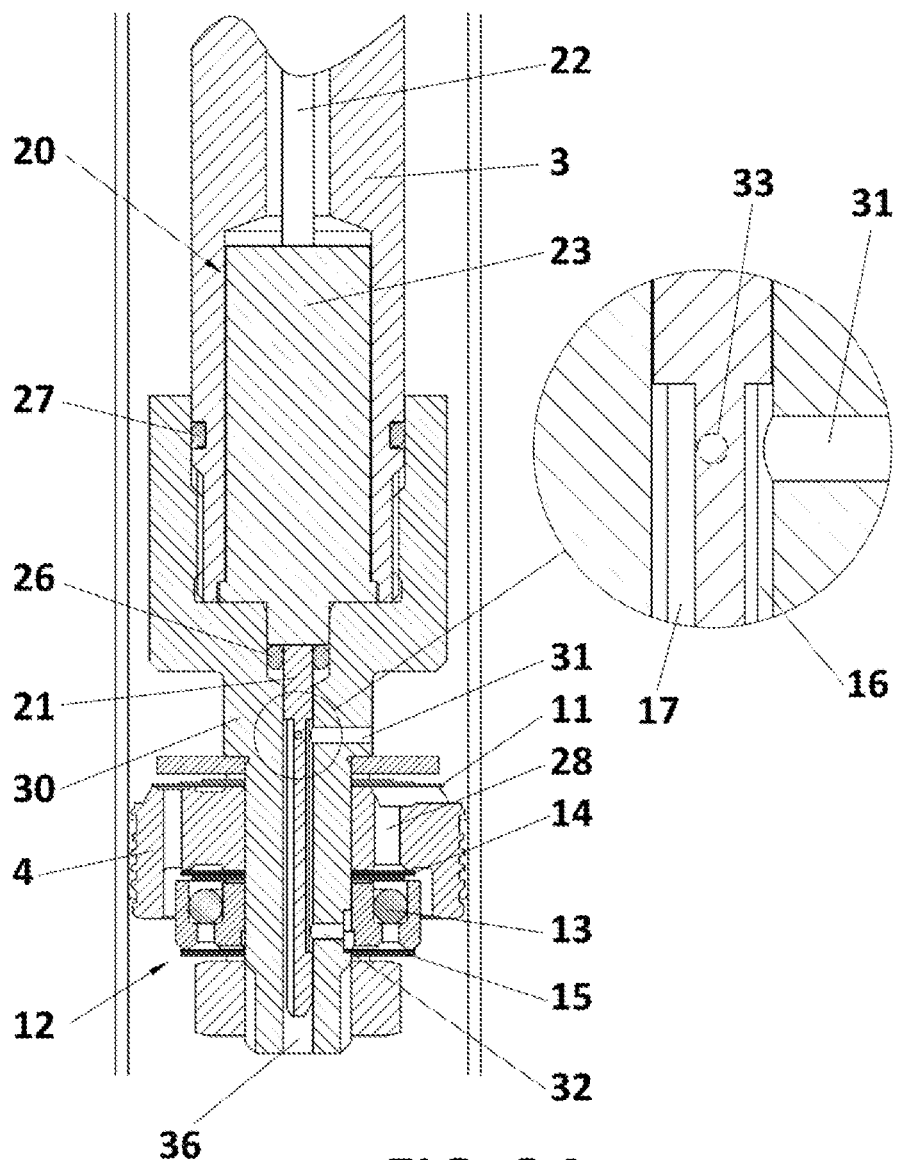
FIG. 3A depicts a longitudinal sectional view of the detail of the area of the piston of the shock absorber of FIG. 1A in a rest situation in a first embodiment.

FIG. 3A shows the components of the invention in greater detail, that is, the area of the actuator (20) and the piston (4). It can be seen in the figure that the piston pin (30) incorporates a first seal (26) with the activating shaft (21) and a second seal (27) with the rod (3). These two seals (26, 27) are used to create a leak-tight space, protected from oil, for housing the actuator body (23), which is an electrical component. In the case of the manually actuated system, shown in FIG. 1B, the seals (26, 27) prevent oil from leaking out of the shock absorber through the axial bore of the rod (3).

In addition, the piston pin (30) also incorporates a first orifice (31), which communicates with the traction chamber (5), a second orifice (32), which communicates with the regulating body (12), a leakage orifice (33), rotated with respect to the first orifice (31), a second leakage orifice (34) with a larger section than the leakage orifice (33) to pass through the piston pin (30), and an axial orifice (36) for housing the activating shaft (21), with which all the previous orifices (31, 32, 33, 34) communicate. This figure also shows the configuration of the activating shaft (21), which has a circular cross-section. It incorporates a first recess which defines a first channel (16) and a second recess which is preferably, though not necessarily, located in a diametrically opposite position, and which defines a second channel (17). The recess of the second channel (17) is preferably larger than that of the first channel (16), in order to generate a lower pressure drop upon passage of the fluid flow volume.

The first channel (16) has a location and length such that it completely communicates the inlet orifice (31) and outlet second orifice (32), but without reaching the free end of the activating shaft (21).

In turn, the second channel (17) has a location which is preferably, though not necessarily, diametrically opposite the first channel (16) and, like the first channel (16), completely communicates the first orifice (31) and the second orifice (32), but with the difference that the length of this second channel (17) reaches the free end of the activating shaft (21).

On the other hand, regarding the regulating body (12), it should be noted that when the shock absorber is in the rest position, the floating piston (13) does not contact the primary valve (14).

The action of the shock absorber of the invention in an extension movement is described below when it is operating according to the different laws. In this situation, the fluid is branched, so that one part follows a lateral path passing from the traction chamber (5) to the compression chamber (6) passing through the through conduit (28) that passes through the piston (4) and the primary permanent passage (42), or also through the primary valve (14) when it opens after a certain speed of the fluid, while another part of the fluid follows a central path, passing through the piston pin (30). The lateral path passing through the piston (4) occurs in all the damping laws and is the usual path in a conventional shock absorber and can only be affected in terms of flow of volume when the passage is more or less closed, while the central path through the piston pin (30) will be described in detail below in the different damping laws.

Figure 3B:
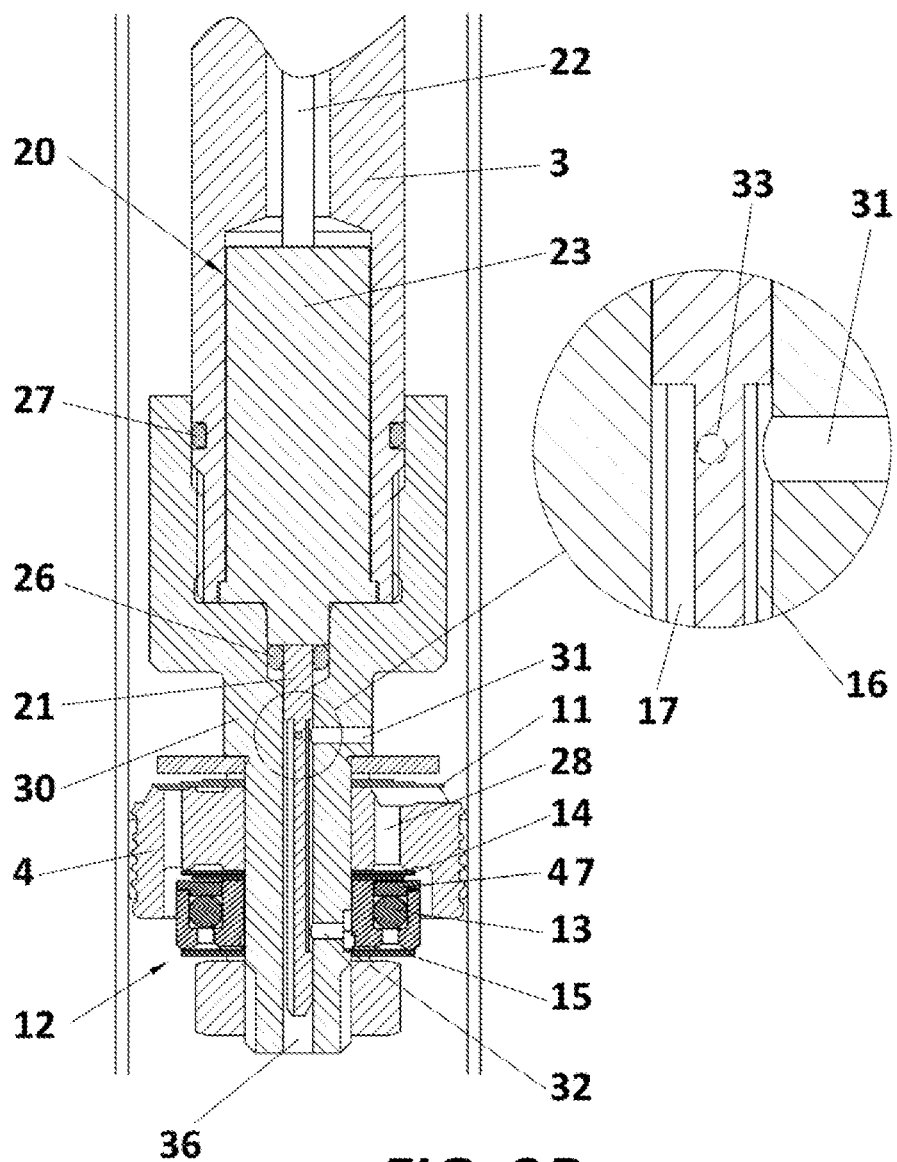
FIG. 3B depicts a longitudinal sectional view of the detail of the area of the piston of the shock absorber of FIG. 1A in a rest situation in a second embodiment.

FIG. 3B depicts an alternative embodiment to that shown in FIG. 3A. In this FIG. 3B a slide (47) has been intercalated between the flexible floating piston (13) and the primary valve (14). The slide (47) is able to move along the same axis as the flexible floating piston (13) and is pushed by same to transmit the force to the primary valve (14) in the diameter delimited by the step that it configures in the outermost area. The basic operation of the system is the same, with the slide (47) providing two advantages.

The first advantage is that the flexible floating piston (13) is better protected in its operation, since it is perfectly encapsulated in all directions by rigid walls. Thus, it can work with higher pressures/forces without the risk of breaking due to lack of resistance or aging caused by the successive application of work cycles.

The second advantage is that it allows to choose the diameter of the primary valve (14) to which the force generated in the flexible floating piston (13) is transferred. In this way, a degree of freedom is gained to establish the level of coupling between the regulating body (12) and the primary valve (14). Therefore, the level of progressiveness (rounding) in the damping force during the opening of the primary valve (14) can be modulated in the hard law, which is achieved by making the floating piston (13) flexible.

Figure 4A:
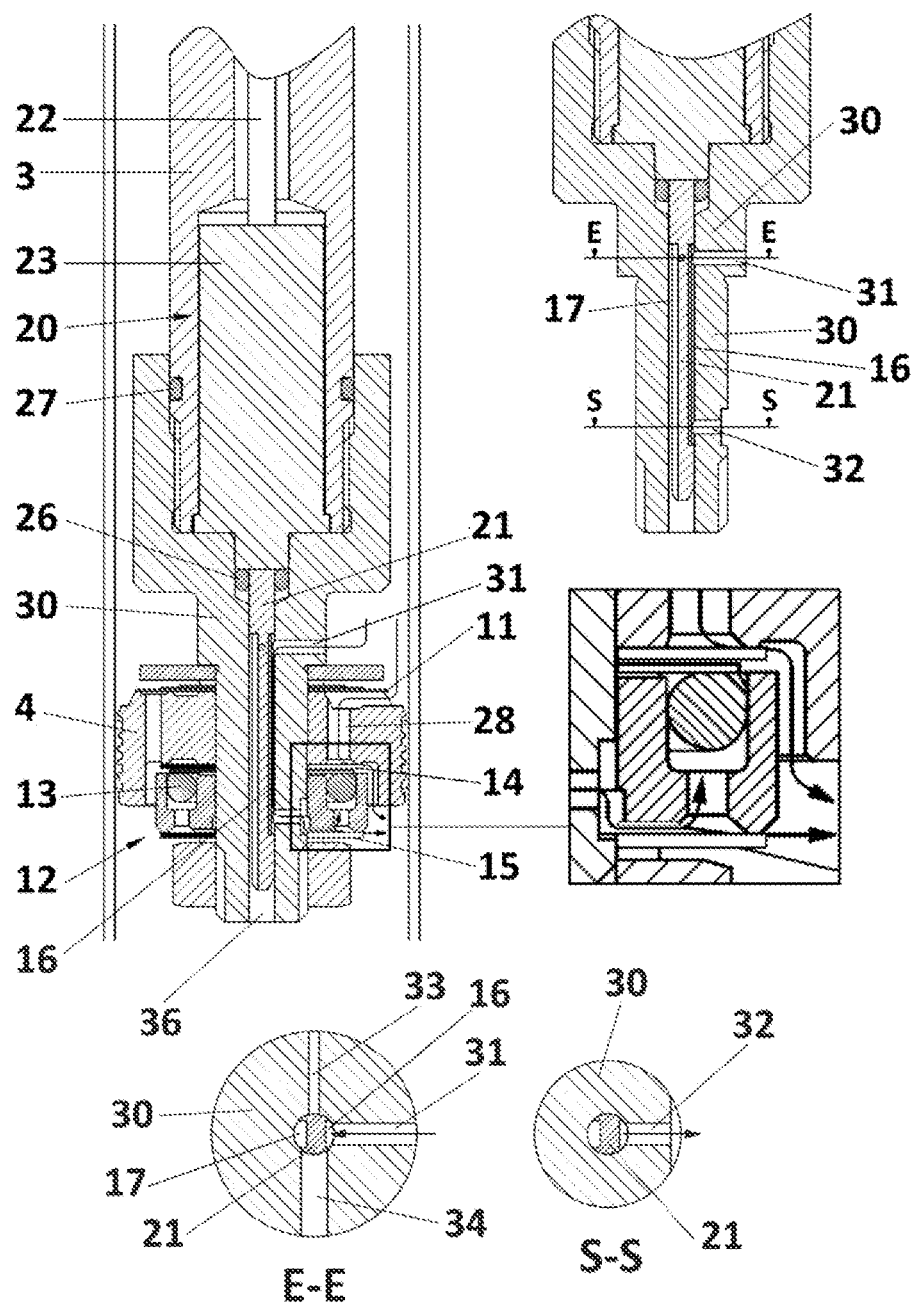
FIG. 4A depicts the shock absorber of FIG. 3A in operation according to a hard damping law together with an enlarged detail of the regulating body.

FIG. 4A shows the shock absorber operating according to a hard damping law, where what is intended is to make it difficult for the fluid to pass between the traction chamber (5) and compression chamber (6) to increase the load. In this case, the fluid circulates from the traction chamber (5) to the compression chamber (6), as well as through the conduit (28), going through the primary permanent passage (42), through the first channel (16). The activating shaft (21) is rotated in such a position that the first channel (16) is in communication with the first orifice (31) and the second orifice (32), with the second channel (17) as well as the leakage orifice (33) and the second leakage orifice (34) being blocked, as shown in sections E-E and S-S. On the one hand, the closure of the leakage orifice (33) and the second leakage orifice (34) provides a minimum leakage section, which is restricted to the permanent passages (42, 43) of the primary valve (14) and secondary valve (15), respectively, generating a maximum damping level for the low speed movements of the piston (4). In this way, the fluid enters through the first orifice (31) to circulate through the first channel (16) and exit through the second orifice (32) passing through the secondary permanent passage (43) located between the regulating body (12) and the secondary valve (15).

Figure 4B:
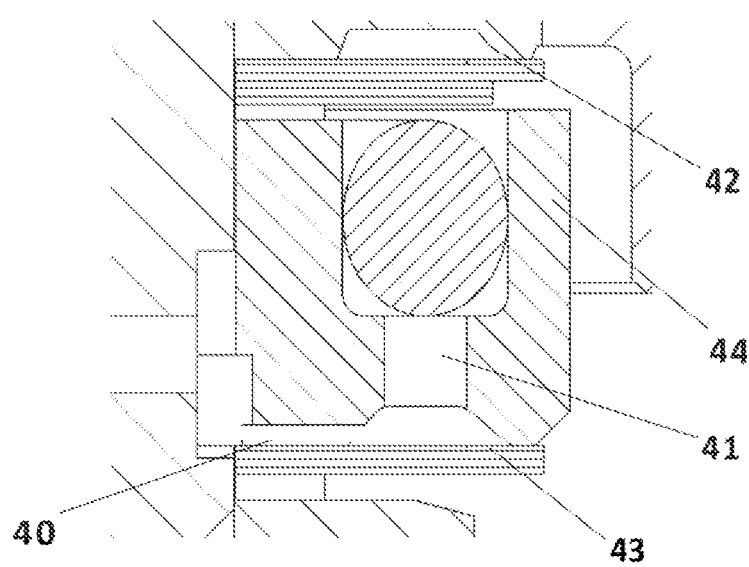
FIG. 4B depicts the regulating body in detail.

FIG. 4B depicts an enlarged detail of the regulating body (12) with the floating piston (13) together with the primary valve (14) and secondary valve (15).

On the one hand, the conduit (28) communicates with the compression chamber (6) through the primary valve (14), which has a primary permanent passage (42).

On the other hand, the first channel (16) is attached to the access channel (40) through the second orifice (32), allowing fluid to enter the regulating body chamber (41). Additionally, the fluid can escape from the regulating body chamber (41) towards the compression chamber (6) through the secondary valve (15), which has a secondary permanent passage (43).

Although the permanent passages (42, 43) are always open, regardless of whether the primary valve (14) or secondary valve (15) are closed, they are actually optional and might not exist. In either of the two cases, as the pressure of the fluid increases, the corresponding valve (14, 15) will open, increasing the passage section for the circulation of the fluid.

Thus, when there is a secondary permanent passage (43) or when the pressure is sufficient to open the secondary valve (15), while part of the fluid goes directly to the compression chamber (6), a part of this fluid enters the regulating body chamber (41), acting on the floating piston (13) to exert pressure on the primary valve (14), which tends to close, making it difficult for the fluid to pass through the conduit (28) of the piston (4) with a closure of the conduit (28) which is proportional to the force created by this pressure. This FIG. 4A reflects the movement of the floating piston (13) to move the primary valve (14), something that only occurs in the case of hard law as will be described.

In a preferred embodiment, the floating piston (13) is a deformable elastic element, for example, made of rubber, and has a toroidal configuration. In this way, in the instant that the floating piston (13) contacts the primary valve (14), it transmits the force in the contact area, normally in the central area of the valve (14). However, as the pressure increases, the floating piston (13) deforms, transmitting force over a larger surface and tending to be moved towards the outer diameter of the valve (14). This is because the oil can escape freely between the secondary valve (15) and the regulating body casing (44) of the regulating body (12), but not in the rest of the spaces that contact the floating piston (13), where the oil, which is essentially incompressible, is trapped. This deformation can be seen in the detail in FIG. 4A, and provides a smooth and progressive transition between low-speed and medium-speed damping, as shown by the hard law in FIG. 12.

Figure 5:
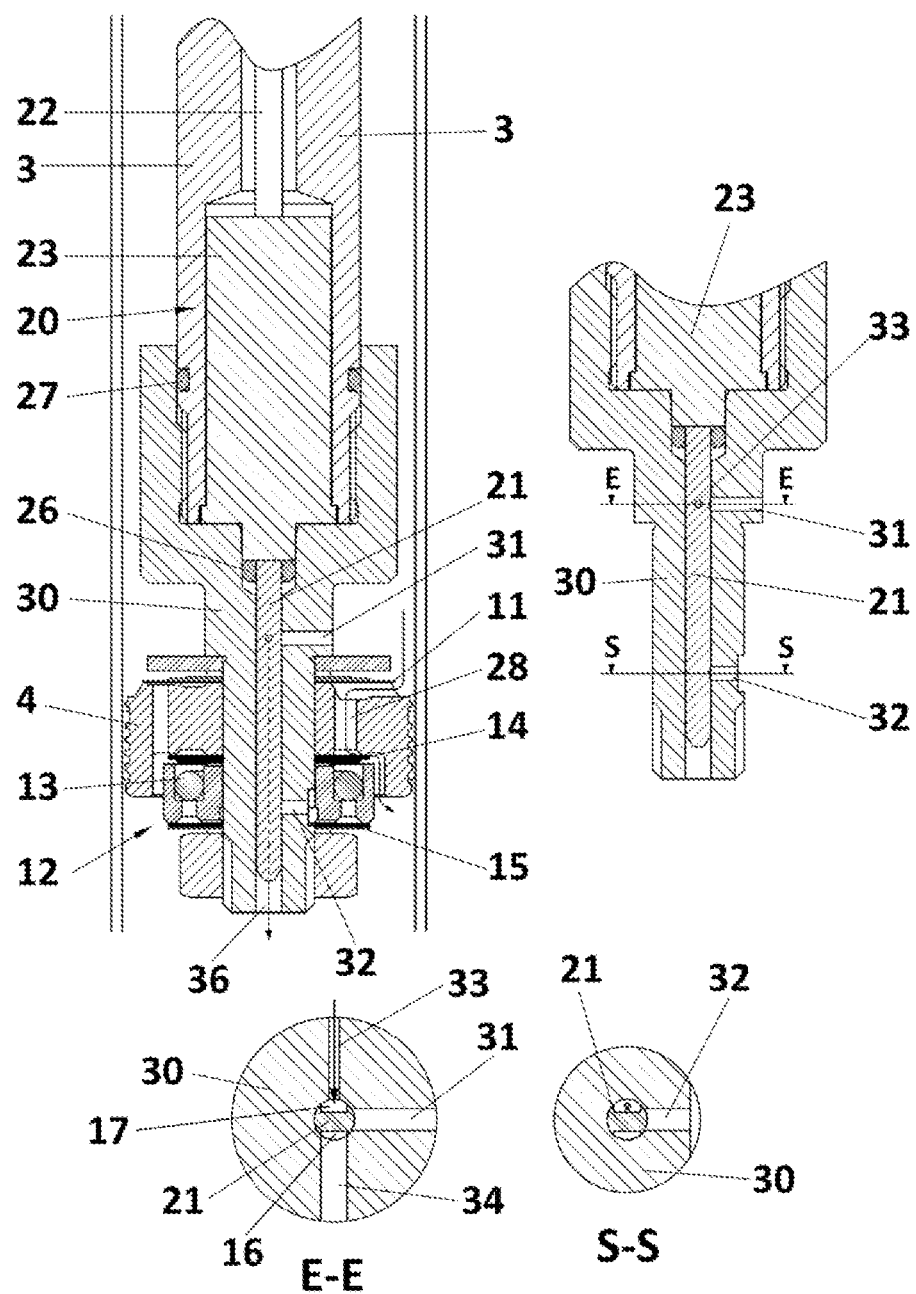
FIG. 5 depicts the shock absorber of FIG. 3A in operation according to an intermediate damping law.

FIG. 5 shows the shock absorber in operation according to an average damping law, the one most commonly used. In this case, the fluid circulates from the traction chamber (5), as well as through the conduit (28), through the leakage orifice (33), which connects with the second channel (17) of the activating shaft (21), with direct access to reach the compression chamber (6), as shown in sections E-E and S-S. In this way, the leakage section of the hard law is increased, reducing the damping for low-speed movements of the piston (4). The activating shaft (21) is rotated in such a position that it blocks access by the fluid to the first orifice (31) and although it can pass through the second leakage orifice (34), which connects with the first channel (16), it does not connect with the compression chamber (6), since the length of the first channel (16) does not reach the free end of the activating shaft (21). In this case, since the floating piston (13) does not move, the fluid circulates through the conduit (28) without any type of additional limitation, reducing the damping with respect to the hard law for medium- and high-speed movements of the piston (4).

Figure 6:
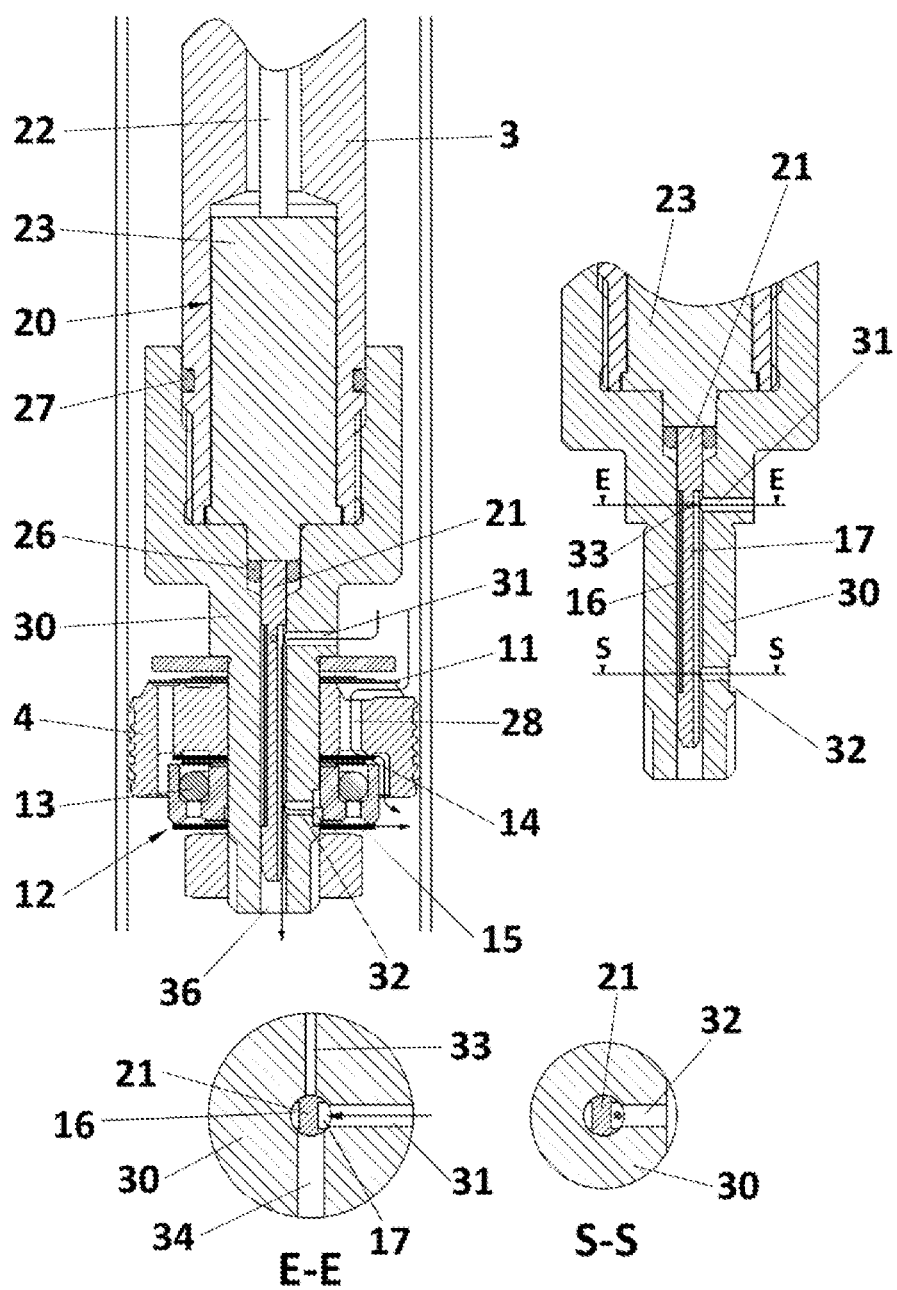
FIG. 6 depicts the shock absorber of FIG. 3A in operation according to a soft damping law.

FIG. 6 shows the shock absorber operating according to a soft damping law, where what is intended is to make it easy for the fluid to pass between the traction chamber (5) and compression chamber (6) to reduce the load. In this case, the fluid circulates from the traction chamber (5) towards the compression chamber (6), as well as through the conduit (28), through the second channel (17). The activating shaft (21) is rotated in such a position that the second channel (17) is connected with the first orifice (31), the leakage orifice (33) and the second leakage orifice (34) being blocked, as shown in section E-E. Given that the first orifice (31) has a larger passage section than the leakage orifice (33), the leakage section is larger than the intermediate law, resulting in a reduction of the damping force. In addition, the fluid continues to circulate through the conduit (28) without any type of additional limitation.

In this way, the fluid enters through the first orifice (31) to circulate through the second channel (17) and exits mostly through the opening at the end of the axial orifice (36) of the piston pin (30) until it reaches the compression chamber (6). A minimal part of the oil flow is diverted through the second orifice (32) towards the regulating body chamber (41). However, the enormous resistance to the passage of fluid offered by the second orifice (32), especially due to the access channel (40), when compared with the opening at the end of the axial orifice (36), makes this flow negligible and lacking in force to move the floating piston (13). This absence of effect is facilitated by the interposition of the floating piston (13), as an element that transmits the pressure of the regulating body (12) towards the primary valve (14). In the absence of the floating piston (13), there would be a direct pressure transfer in the regulating body (12) which, even with minimal oil flow, would be able to exert a certain closing pressure on the primary valve (14). In such a case, the soft law would generate more damping force than the intermediate law from a certain piston (4) speed.

Figure 7:
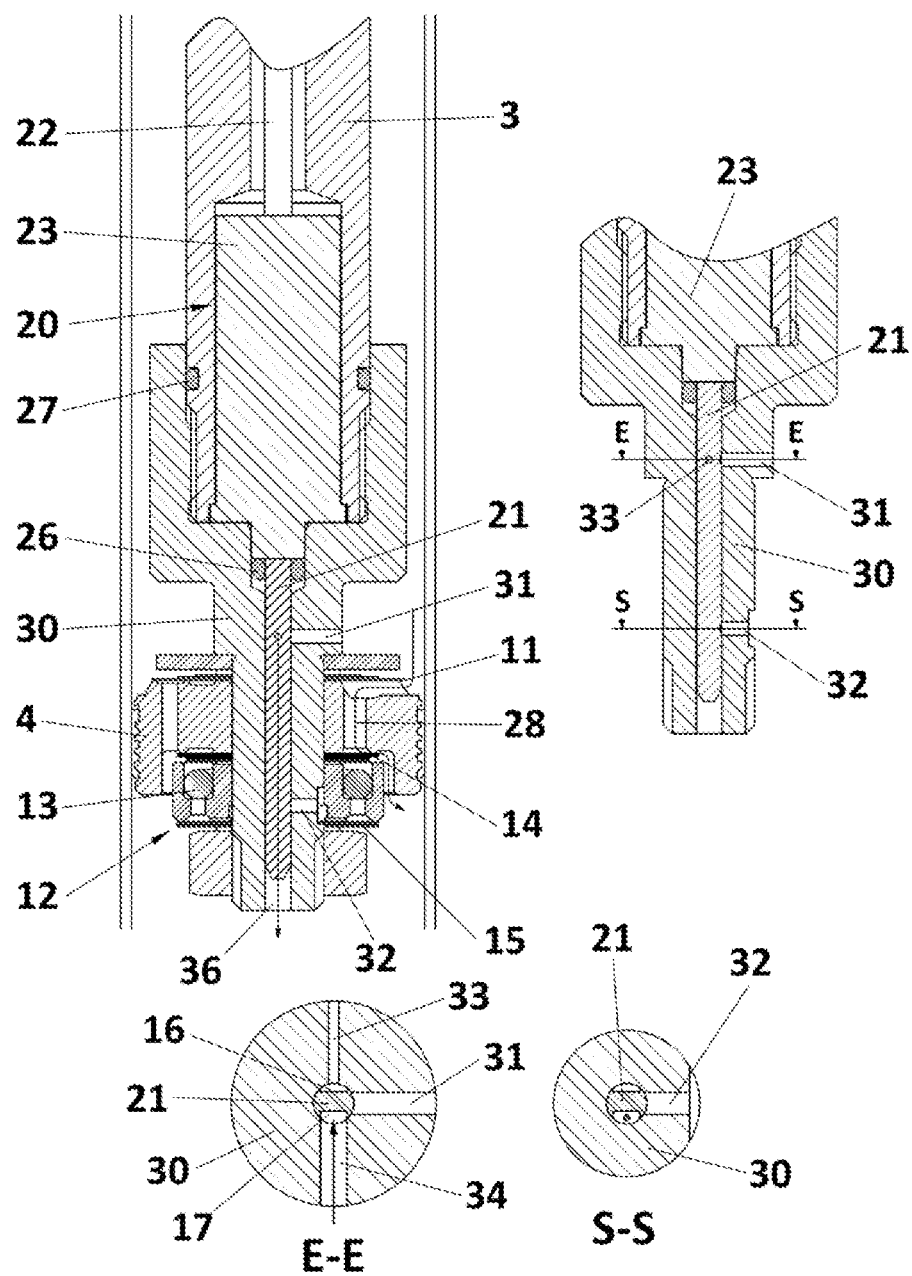
FIG. 7 depicts the shock absorber of FIG. 3A in operation according to a very soft damping law.

FIG. 7 shows the shock absorber operating according to a very soft damping law. In this case, the activating shaft (21) is rotated in such a position that the fluid circulates from the traction chamber (5), as well as through the conduit (28), through the second channel (17) through the second leakage orifice (34), with direct access to reach the compression chamber (6), as shown in sections E-E and S-S. In this situation, the fluid circulates through an orifice with a larger section than in any of the previous cases, since the second leakage orifice (34) is the one with the largest passage section of all the orifices (31, 33, 34) which communicate with the traction chamber (5), so that the resistance to the passage of fluid in this embodiment is lower than in the previous embodiments, giving rise to a very soft damping law.

As indicated in FIG. 5, in this case the leakage orifice (33) connects with the first channel (16), which has a closed end, so the fluid does not circulate in this way.

FIGS. 8 to 11 depict a second embodiment with respect to FIGS. 4 to 7, respectively, where the shock absorber incorporates four modifications that lead to the hardening of the laws.

The first modification consists of incorporating an additional regulating body (12'), with the corresponding additional floating piston (13'), additional secondary valve (15') and additional second orifice (32'), so that the compression chamber (6) incorporates two regulating bodies (12, 12') instead of one.

The second modification consists of suppressing the second leakage orifice (34).

The third modification is related to the first orifice (31) and the second orifice (32) of the piston pin (30). In this way, there is incorporated a third leakage orifice (35), located as an extension of the already existing first orifice (31), although with a substantially smaller passage section, and also an additional second orifice (32') located in correspondence with the additional regulating body (12').

Both the first channel (16) and the second channel (17) maintain their lengths, that is, the first channel (16) has such a length that it communicates the first orifice (31) and the second orifice (32), while the second channel (17) has such a length that it communicates the first orifice (31) with the free end of the activating shaft (21). In addition, the activating shaft (21) incorporates a third channel (18) which communicates the first orifice (31) with the two second orifices (32, 32'), but without reaching the free end of the activating shaft (21). In addition, it is located between the first channel (16) and the second channel (17) in an anti-clockwise direction seen from the free end of the activating shaft (21), and preferably in symmetry.

Figure 8:
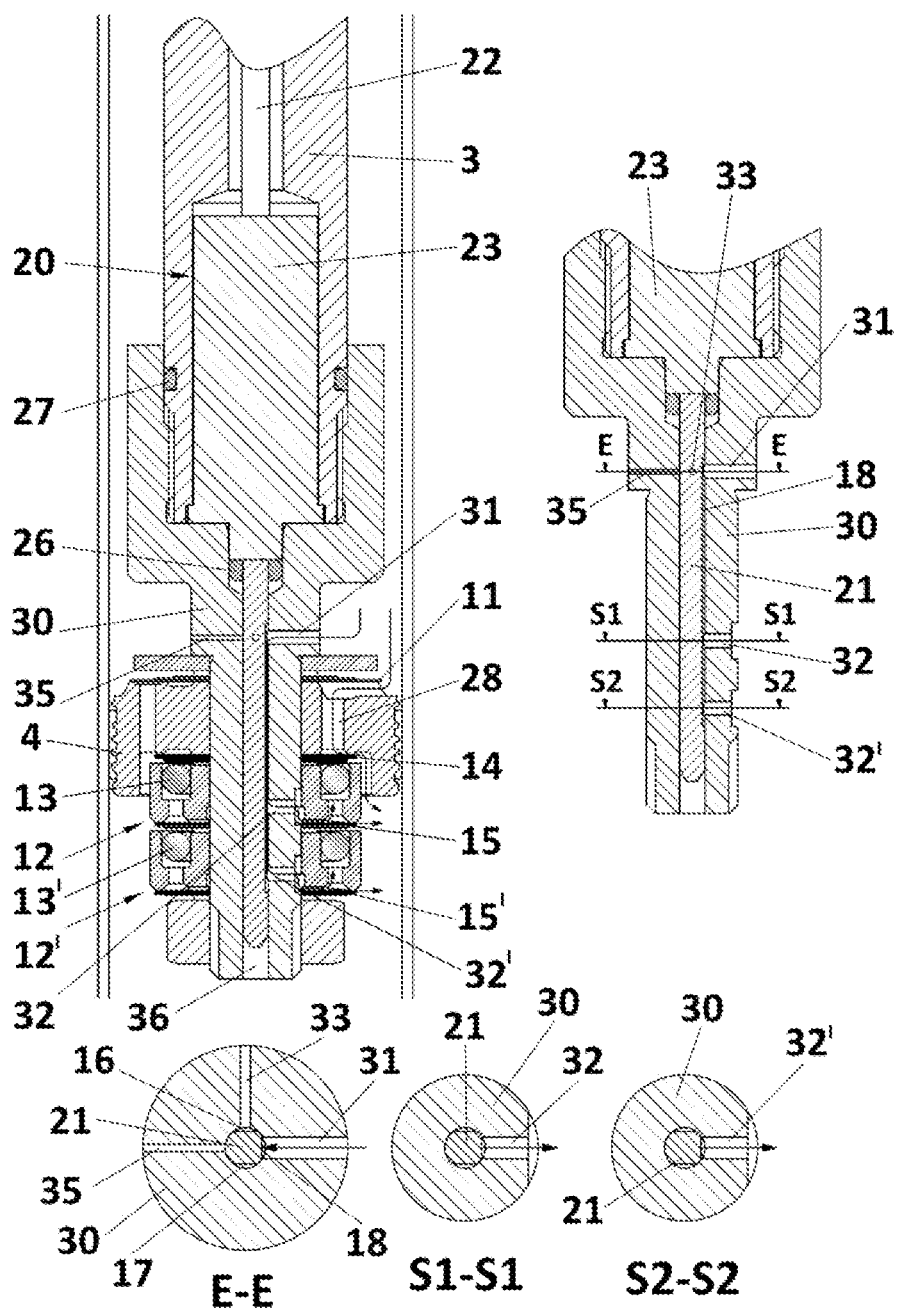
FIGS. 8 to 11 depict a second embodiment with respect to FIGS. 4 to 7, respectively, where the laws are hardened by modifying orifices in the piston pin, adding channels in the activating shaft and using two regulating bodies.

Thus, FIG. 8 depicts a shock absorber operating according to a very hard law. The fluid, in addition to going to the compression chamber (6) through the conduit (28) passing through the primary valve (14), also does so by entering through the first orifice (31) to circulate through the third channel (18) and exit through the two second orifices (32, 32'), the third leakage orifice (35) and the second channel (17) being blocked. The leakage orifice (33) is in communication with the first channel (16) which, since it is not in communication with the second orifice (32) or with the opening at the end of the axial orifice (36), is also blocked. This situation is shown in sections E-E, S1-S1 and S2-S2. In this situation, a part of the fluid enters the two regulating bodies (12, 12'), acting on the corresponding floating pistons (13, 13'). The difference in this case is that the fluid that exits through the additional second orifice (32'), located further away, in addition to going through the additional secondary valve (15') to go directly to the compression chamber (6), also enters the chamber of the additional regulating body (12') and pushes the additional floating piston (13') to exert pressure on the secondary valve (15) of the regulating body (12), which tends to close to interrupt the passage of fluid towards the compression chamber (6) from the upper second orifice (32) and forcing it to go to the regulating body (12), pushing the floating piston (13) of the regulating body (12) to move the primary valve (14), which tends to close to interrupt the passage of the fluid through the conduit (28) of the piston (4) with a closure proportional to the force created by this pressure. However, the secondary valve (15) and primary valve (14) are respectively pressed by the floating pistons (13') and (13). This increases the resistance to the passage of oil through the secondary valve (15), compared to the previous design. This greater resistance generates greater pressure in the regulating body chamber (41), which finally causes the floating piston (13) to exert greater force on the primary valve (14).

Figure 9:
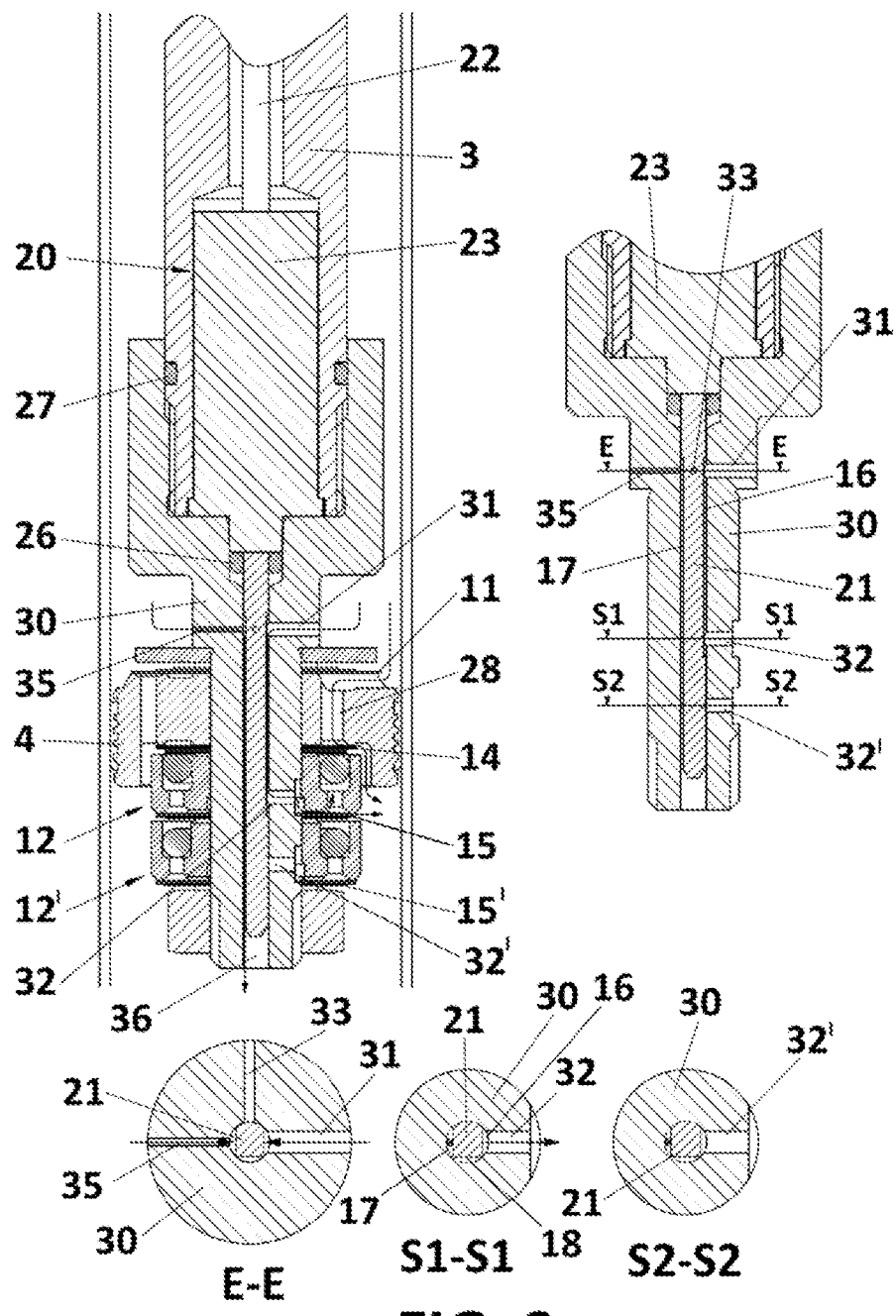

FIG. 9 shows the shock absorber operating according to a hard damping law. In this case, the activating shaft (21) is rotated in such a position that the fluid accesses the compression chamber (6) from the traction chamber (5), as well as through the conduit (28), through two other ways. On the one hand, it accesses through the third leakage orifice (35)

to circulate through the second channel (17), which connects directly with the compression chamber (6) through the opening at the end of the axial orifice (36). On the other hand, the fluid also accesses through the first orifice (31) to circulate through the first channel (16), which connects with the second orifice (32) passing through the access channel (40) and the secondary valve (15) of the regulating body (12) either through the secondary permanent passage (43), if there is one, or through the opening of the secondary valve (15) itself if a sufficient level of pressure had been reached. In this situation, while part of the fluid goes directly to the compression chamber (6) through the secondary valve (15), another part of the fluid enters the regulating body chamber (41), acting on the floating piston (13) to exert pressure on the primary valve (14), which tends to close, making it difficult for the fluid to pass through the conduit (28) of the piston (4) with a closure of the conduit (28) proportional to the force created by this pressure. If there is no secondary permanent passage (43) or if the pressure is not high enough to open the secondary valve (15), all the fluid would go to the regulating body chamber (41), acting on the floating piston (13) to close the primary valve (14) with additional pressure.

Figure 10:
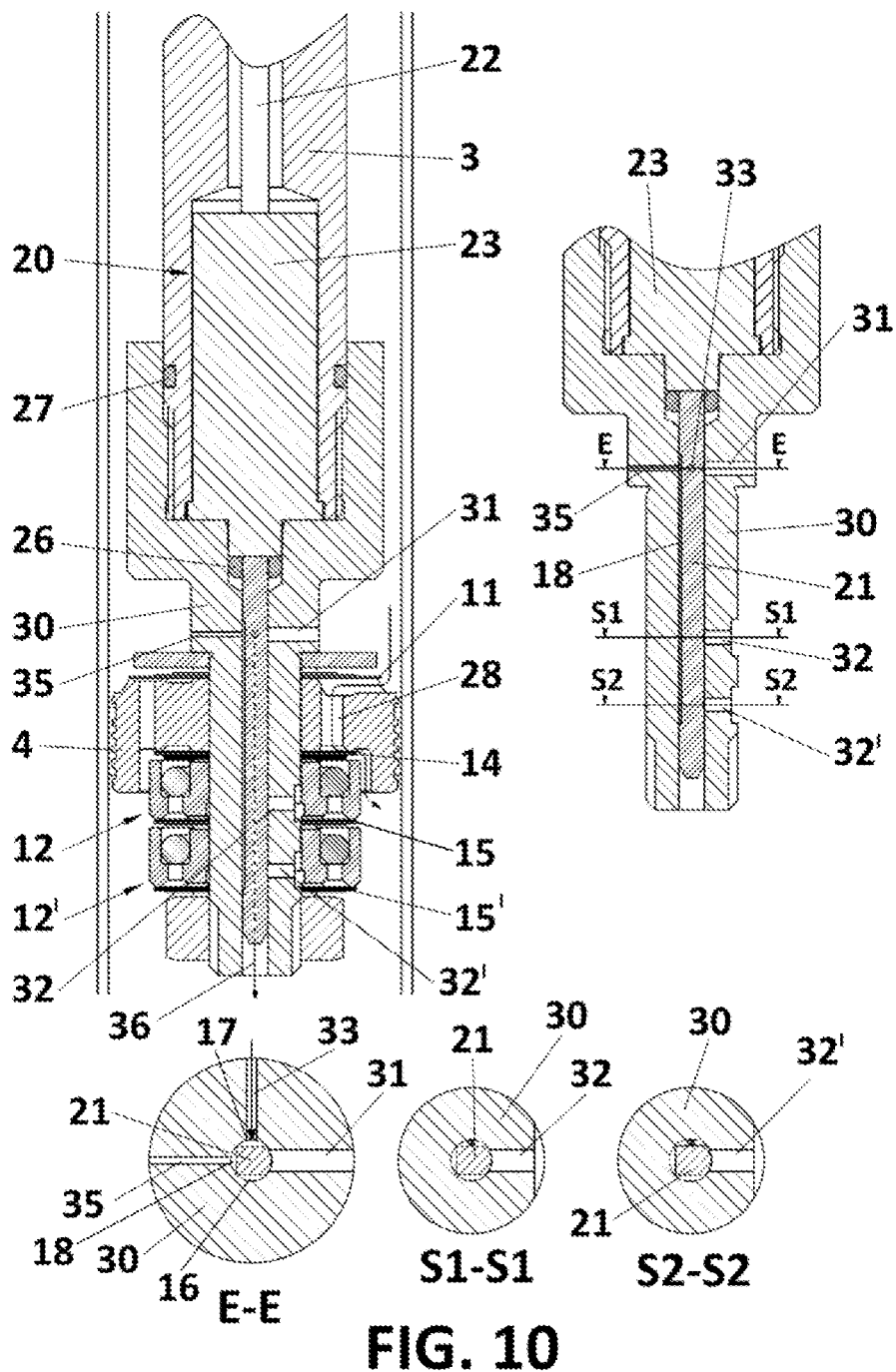

FIG. 10 shows the shock absorber operating according to an intermediate damping law. In this case, the fluid accesses the compression chamber (6) from the traction chamber (5), as well as through the conduit (28), through the leakage orifice (33), which connects with the second channel (17) of the activating shaft (21), with direct access to reach the compression chamber (6), as shown in sections E-E, S1-S1 and S2-S2. The activating shaft (21) is rotated in such a position that it blocks access by the fluid to the first orifice (31) and although the fluid can pass through the third leakage orifice (35), which connects with the first channel (16), it does not connect with the compression chamber (6), since the length of the first channel (16) does not reach the free end of the activating shaft (21). In this case, since the floating piston (13) does not move, the fluid circulates through the conduit (28) without any type of additional limitation.

Figure 11:
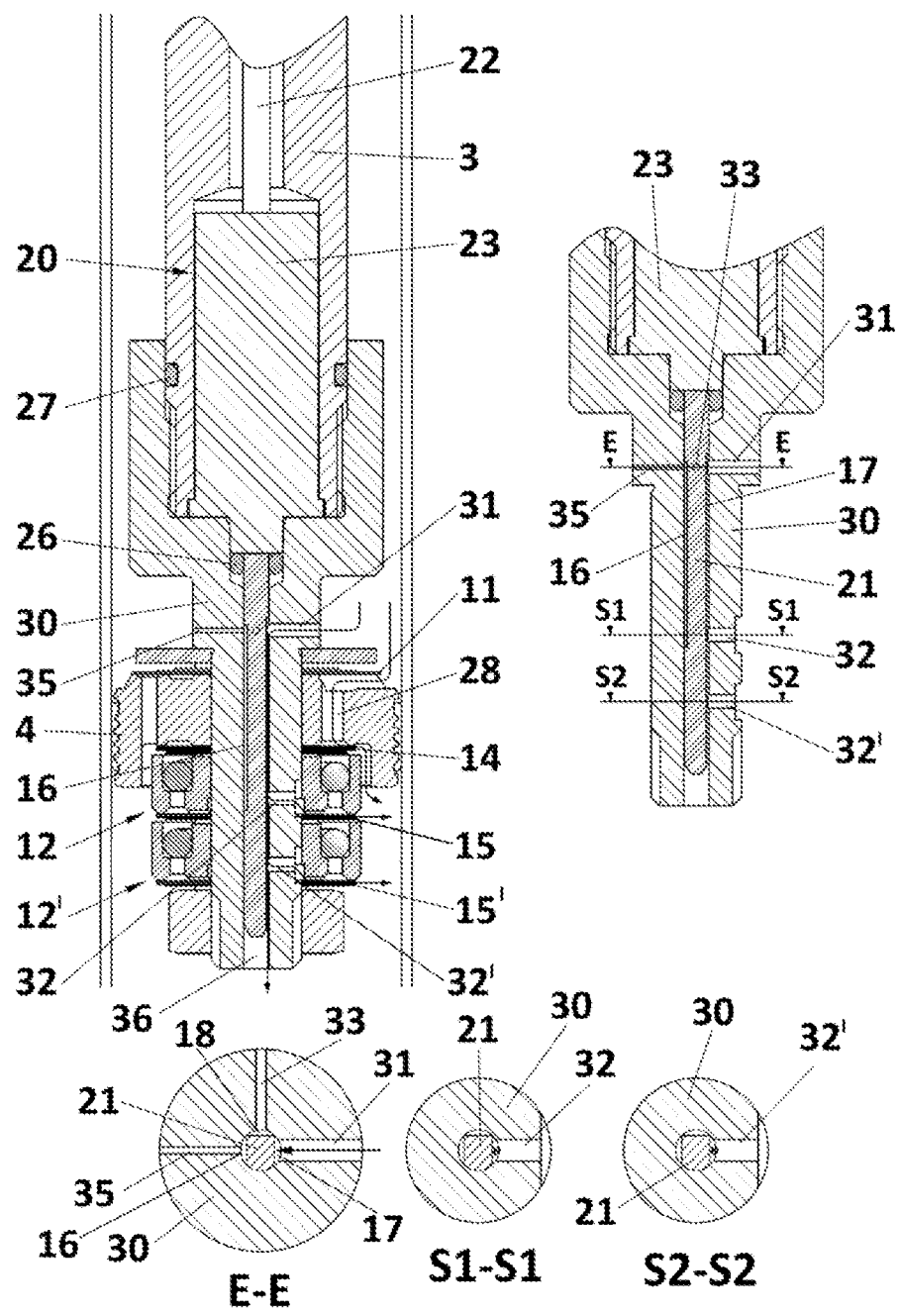

FIG. 11 shows the shock absorber operating according to a soft damping law. In this case, the fluid circulates from the traction chamber (5) towards the compression chamber (6), as well as through the conduit (28), through the second channel (17). The activating shaft (21) is rotated in such a position that the second channel (17) is connected to the first orifice (31), the leakage orifice (33) and the third leakage orifice (35) remaining blocked, since these orifices are connected to the first channel (16) and the third channel (18), respectively, the lengths of which do not reach the free end of the activating shaft (21), as shown in sections E-E, S1-S1 and S2-S2. Since the first orifice (31) has a larger passage section than the leakage orifice (33), the pressure drop is less and therefore the damping force is greater than that depicted in FIG. 10 for the intermediate law. In addition, for the same reasons as in the previous construction, the fluid continues to circulate through the conduit (28) without any type of additional limitation.

Figure 12:
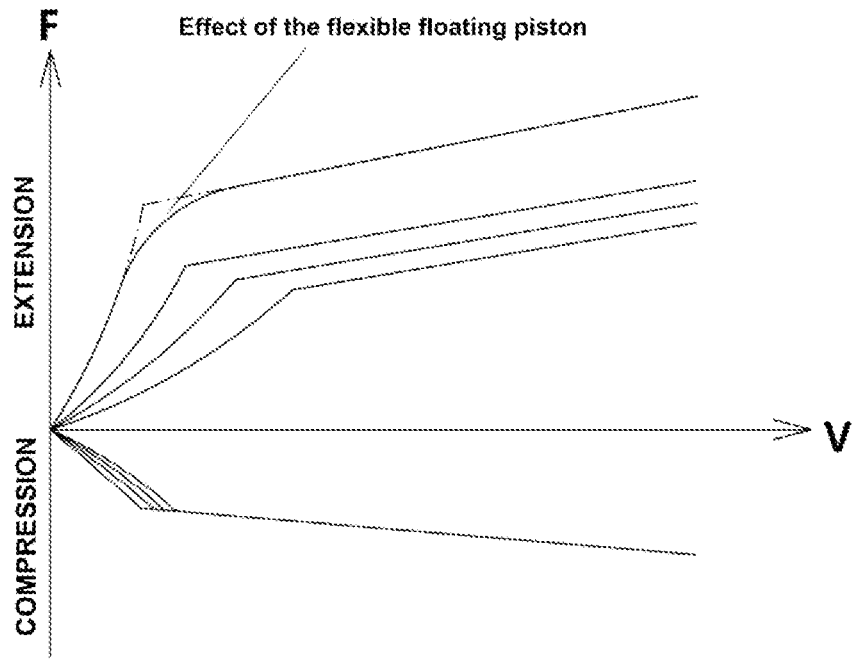
FIG. 12 depicts a graph with the variation of the damping force depending on the speed of the piston for the shock absorber of the invention depicted in FIGS. 1A-1B for extension movements.

FIG. 12 shows a graph where the variation of the damping force is depicted depending on the speed of the piston (4) for extension movements according to the shock absorbers depicted in FIG. 1. This graph shows the progressiveness in the application of force during the operation of the shock absorber according to the different laws applied, from hard to very soft, where an important effect is the fact that there is a floating piston (13) made of an elastic material, the deformability of which causes a progressive transition between the damping at low speed prior to the opening of the primary valve (14) and the damping at medium speed, avoiding the abrupt opening of said primary valve (14) that would lead to the sharp change in slope shown in dashed lines. This feature makes it possible to more effectively filter out irregularities in the terrain, while at the same time achieving a progressive increase in the damping force, minimizing chassis acceleration peaks and the risk of noise, once again improving comfort.

For low-speed movements of the piston (4), the invention allows different levels of damping force to be selected by means of a fixed permanent leakage, which can be included or not through relief discs in the valves, and a variable permanent leakage that is enabled or not depending on the damping law defined by the activating shaft (21), and the first orifice (31) with the leakage orifice (33), on the one hand, and the second orifice (32) with the axial orifice (36), on the other hand, as inlet and outlet orifices for fluid from the piston pin (30), respectively, in the compression phase. The modification of the permanent passage in the piston (4) also partially affects the damping force for low-speed compression movements of the piston (4), as shown in the curves of FIG. 12.

For medium- and high-speed movements of the piston (4), the activating shaft (21) activates or deactivates the oil flow towards the regulating body (12), causing the level of damping force from the opening of the primary valve (14) to increase or decrease, with an approximately equal slope for all grades.

Figure 13:
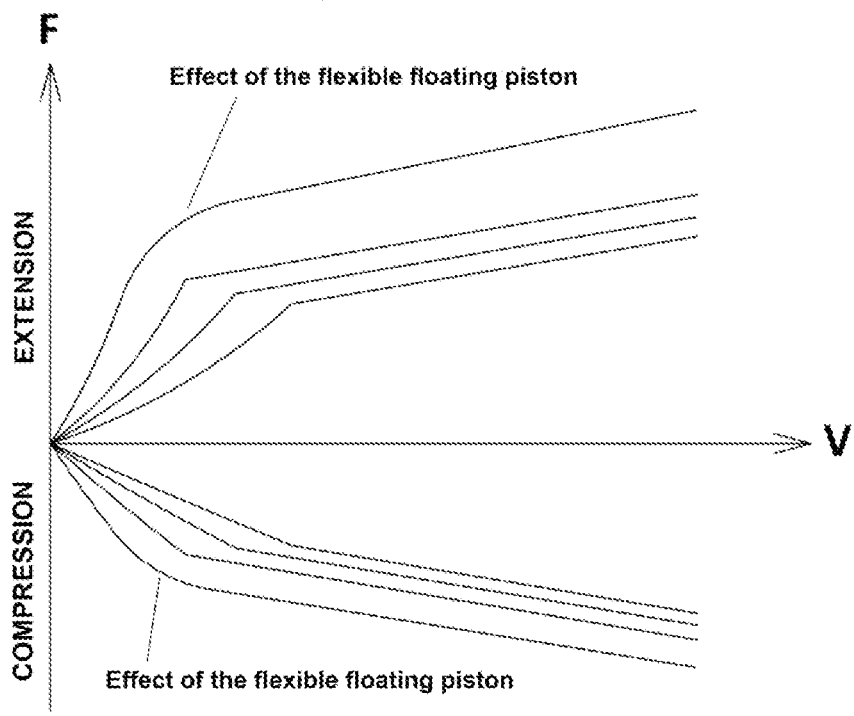
FIG. 13 depicts a graph with the variation of the damping force depending on the speed of the piston for the shock absorber of the invention depicted in FIGS. 2A-2B for extension and compression movements.

In the case of having a shock absorber operating both for extension and compression, such as the one depicted in FIGS. 2, the variation of the damping force depending on the speed of the piston (4) is shown in FIG. 13, where the case of compression is very similar to the case of extension.

Figure 14A:
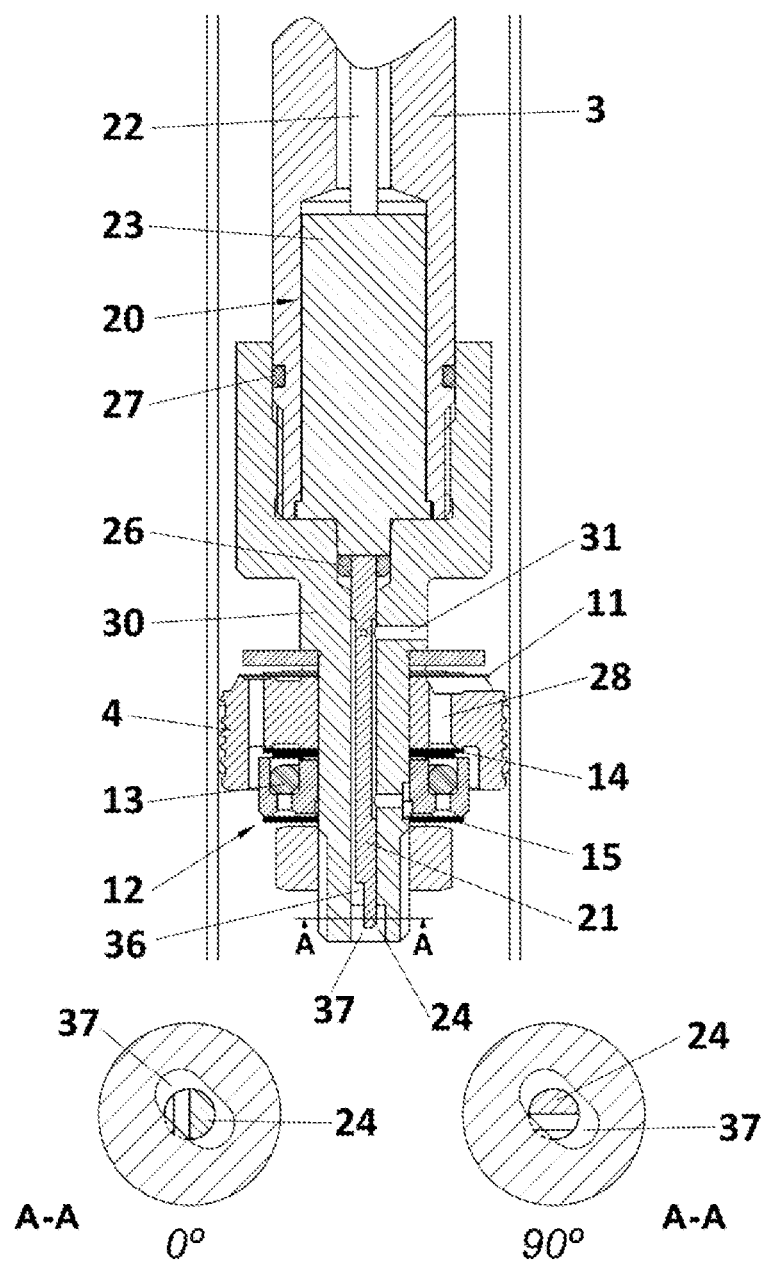
FIG. 14A depicts the shock absorber of FIG. 3A for the embodiment focused solely on two laws, incorporating a mechanical locking system.

FIG. 14A depicts a new embodiment of the shock absorber of the invention in which a mechanical stop is incorporated to the rotational movement of the activating shaft (21). The modifications affect the axial orifice (36) of the piston pin (30) and the activating shaft (21).

On the one hand, the free end of the activating shaft (21) has a longitudinal extension (24) to go from having a circular cross-section to having a semicircular section, the section having been lowered by half.

On the other hand, the axial orifice (36) is modified at the free end to go from having a circular section to being an end orifice (37) with a configuration defined by an orifice with an oblong and offset section.

The end orifice (37) has a length such that it houses at least part of the extension (24) of the activating shaft (21). In this way, the movement of the activating shaft (21) is limited to ninety degrees, a quarter of a turn, as the walls of the end orifice (37) act as a mechanical stop, preventing the extension (24) from advancing further. This is depicted in section A-A, taken at two different moments of rotation of the activating shaft (21), in such a way that the rotation of the activating shaft (21) is limited so that the shock absorber can only pass from a hard law to an intermediate law, and vice versa, that is, from the situation shown in FIG. 4A to that shown in FIG. 5.

This construction is advantageous due to its simplicity and because it makes it possible to control the position of the orifices of the piston pin (30) with respect to the channels of the activating shaft (21) with the same part, the actuator (20) itself.

Figure 14B:
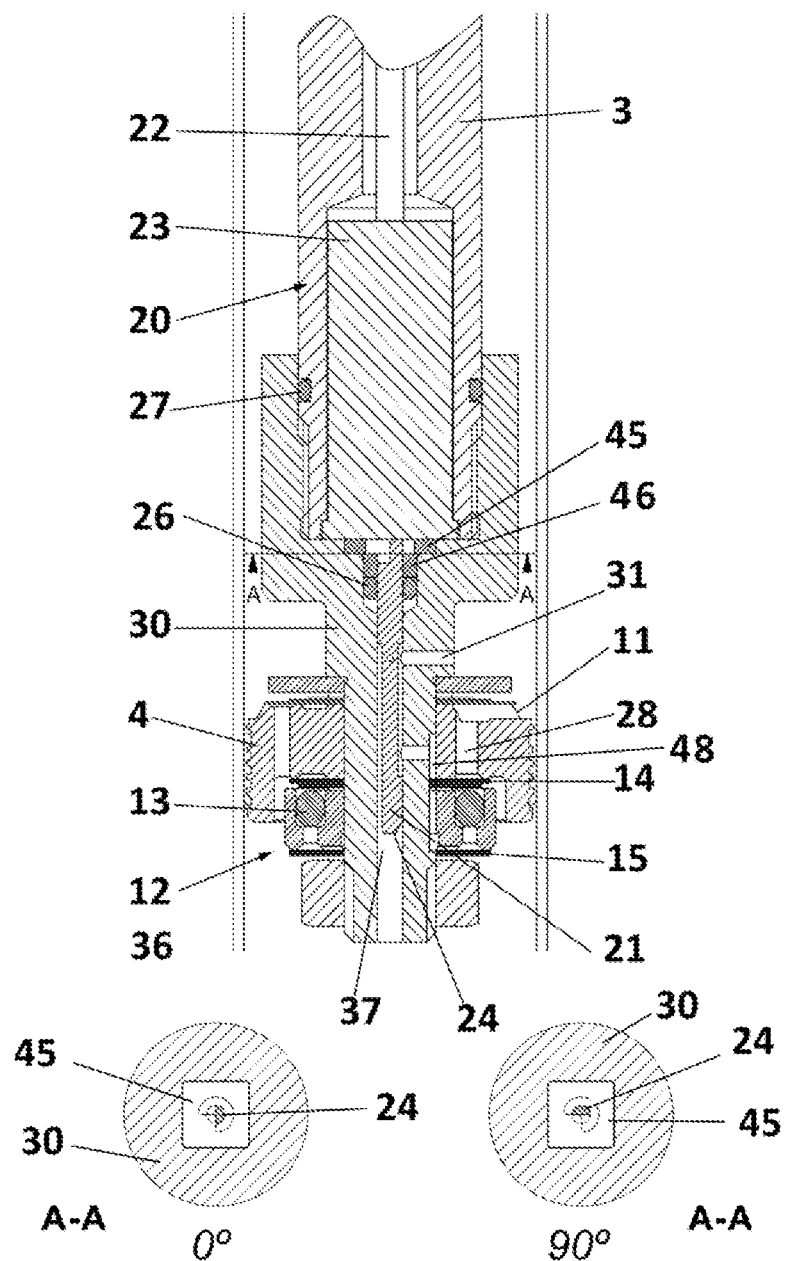
FIG. 14B depicts an alternative embodiment to the locking system shown in FIG. 14A which, in this case, incorporates a separation bushing and a rotation limiting plate.

FIG. 14B is another embodiment of the shock absorber of the invention which incorporates an angular locking system consisting of a rotation limiting plate (45) at the base of the activating shaft (21), where the window that restricts rotation of the activating shaft (21) has a geometry of three quarters of a circle. The activating shaft (21) has undergone grinding and a section of the end incorporates a flat face, leaving a suitable semicircular section to allow a 90° rotation in the window of the rotation limiting plate (45). This plate can be an isolated element or be incorporated into the actual actuator body (23). In addition, between the sealing gasket (26) and the rotation limiting plate (45) there is a separation bushing (46). It can also be seen that, in this embodiment, the activating shaft (21) has been depicted as shorter, since the second orifice (32) has moved upwards in the piston pin (30). The flat face (48) of the piston pin (30) has been extended until it reaches the access channel (40) of the regulating body (12).

The flat faces (48) of the piston pin (30), in any of the embodiments of the invention, have the function of absorbing the dimensional variations in the axial direction that are generated with the tolerances of the parts and, mainly, with the variation in the number and thickness of the piston (4) valves.

Figure 15:
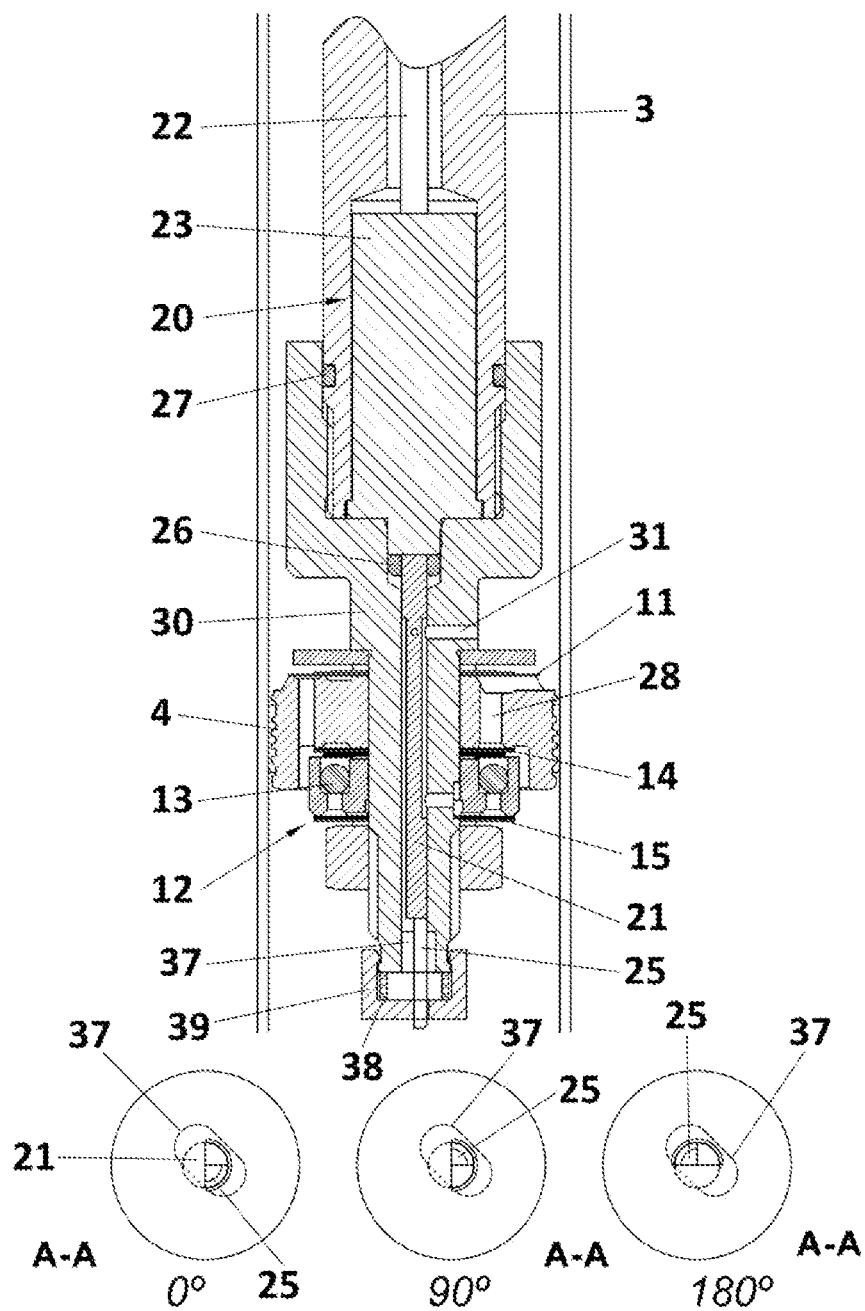
FIG. 15 depicts the shock absorber of FIG. 3A for the embodiment focused on three laws, incorporating a mechanical locking system.

FIG. 15 also depicts an evolution of the mechanical stop depicted in FIG. 14. It incorporates the modifications made both in the axial orifice (36) of the piston pin (30) and in the activating shaft (21), with the difference that instead of having a cross-section in the shape of a semicircle, the extension (24) becomes a modified extension (25), where now it is in the shape of a quarter circle, that is, with two flat faces. This configuration achieves the modified extension (25) of the activating shaft (21) not acting as a mechanical stop on the walls of the end orifice (37), but rather it can continue rotating an additional quarter of a turn, at which time it does in fact again act as a mechanical stop and the rotation movement is limited. This movement is shown in the views of FIG. 15, where three bottom views are depicted with the positions of the modified extension (25) with respect to the end orifice (37).

In this way, control of the position of the shock absorber is achieved for three hard, intermediate and soft laws.

To control 90° rotation, the position generated by the intermediate law, a mechanism made up of a disc (39) and a spring (38) is introduced. The disc (39) is mounted on the piston pin (30) by means of tabs, compressing the spring (38) in a predetermined position. The compression of the spring (38) generates a controlled contact force between the disc (39) and the piston pin (30) which, in turn, generates a controlled torque against rotation by friction.

As shown in FIG. 15, when the modified extension (25) rotates from 0° to 90°, it collides against the crescent window of the disk (39). This contact introduces an additional calibrated load on the actuator (20), which translates into an increase in electrical consumption, which can be detected to record the stopping thereof.

If the shaft is rotated up to 180°, the disc (39) is dragged, the crescent-shaped window of which allows a free rotation of 90° until reaching 180°. If it then returns to the 90° position, the shaft moves freely until, upon reaching the desired position, the increase in load due to contact of the shaft with the disc (39) is detected again. In this way, three angular positions can be controlled on the activating shaft (21), two of them by means of fixed mechanical stops and a third by means of a rotary stop.

Lastly, it must be noted that the present invention must not be limited by the embodiment described herein. Other configurations may be carried out by those skilled in the art based on the present description. Accordingly, the scope of the invention is defined by the following claims.

The invention claimed is:

1. A shock absorber with multiple damping laws comprising:
    a regulating body with a primary valve and a secondary valve, and
    an activating shaft with a plurality of channels, the activating shaft being housed in an axial orifice of a piston pin that incorporates a plurality of orifices intended to align by rotation of the activating shaft with the channels to determine a damping law,
    wherein the plurality of orifices comprises at least a first orifice and a second orifice, where at least the second orifice is in direct communication with the regulating body, and
    wherein the regulating body comprises a floating piston that has a toroidal configuration and is made of an elastic material, so that the regulating body gradually transfers a force to the primary valve depending on the pressure to which the regulating body is subjected.

2. The shock absorber with multiple damping laws according to claim 1, wherein the channels of the activating shaft are configured as:
    a first channel, with a length which communicates the first orifice with the second orifice, and
    a second channel, with a length which communicates the first orifice with the free end of the activating shaft.

3. The shock absorber with multiple damping laws according to claim 1, wherein the plurality of orifices of the piston pin are configured as:
    the first orifice, which communicates a traction chamber with the axial orifice of the piston pin,
    the second orifice, which communicates the axial orifice of the piston pin with a compression chamber through the regulating body, and
    a leakage orifice, which communicates the traction chamber with the axial orifice of the piston pin.

4. The shock absorber with multiple damping laws according to claim 3, wherein the piston pin comprises a second leakage orifice, located as an extension of the leakage orifice, with a larger passage section.

5. The shock absorber with multiple damping laws according to claim 1, wherein the shock absorber further comprises a slide located between the floating piston, that is made of an elastic material, and the primary valve capable of sliding along the piston pin with the function of transmitting the force received from the floating piston to the primary valve in a configurable diameter and to protect the floating piston.

6. The shock absorber with multiple damping laws according to claim 1, wherein the shock absorber further comprises two regulating bodies, one located on each side of the piston, so that the shock absorber can work according to different damping laws for compression and extension.

7. The shock absorber with multiple damping laws according to claim 1, wherein the shock absorber further comprises an actuator, housed in a rod of a piston and activated by means of a cable, attached to the activating shaft, so that the selection of the damping law is carried out automatically.

8. The shock absorber with multiple damping laws according to claim 7, wherein the shock absorber comprises a rotation limiting plate which incorporates a window with a geometry of three quarters of a circle, and wherein a section of an end of the activating shaft for attachment to the actuator has a semicircular section and passes through the window of the rotation limiting plate, such that the rotation of the activating shaft is limited to a maximum of 90°.

9. The shock absorber with multiple damping laws according to claim 1, wherein the shock absorber further comprises a stem attached to the activating shaft as an extension, so that the selection of the damping law is carried out by manual action.

10. The shock absorber with multiple damping laws according to claim 1, wherein a free end of the activating shaft has a longitudinal extension with a semicircular cross-section and the axial orifice incorporates an end orifice with an oblong section offset with respect to the activating shaft, so that the movement of the activating shaft is limited to a quarter of a turn, as walls of the end orifice act as a mechanical stop with the extension of the activating shaft.

11. The shock absorber with multiple damping laws according to claim 1, wherein an extension of a free end of the activating shaft is a modified extension with a quarter-circle cross-section, and comprises a disc fixed to an end of the piston pin and pressed by a spring with an orifice in the form of a semicircle through which the modified extension passes, so that the free movement of the activating shaft is limited to a quarter of a turn and can rotate an additional quarter of a turn by dragging the disc against friction generated by the pressure of the spring.

12. The shock absorber with multiple damping laws according to claim 1, wherein the shock absorber comprises an additional regulating body located in concatenation with the regulating body, the regulating body being connected to the second orifice and the additional regulating body being connected to an additional second orifice.

13. The shock absorber with multiple damping laws according to claim 12, wherein the additional regulating body is located in a position further away from a traction chamber.

14. The shock absorber with multiple damping laws according to claim 12, wherein the activating shaft comprises a third channel, with a length which communicates a first orifice, of the plurality of orifices, with the two outlet orifices.

15. The shock absorber with multiple damping laws according to claim 12, wherein the piston pin comprises a third leakage orifice, with a smaller passage section than that of a first orifice of the plurality of orifices.

* * * * *